(12) United States Patent
Deng et al.

(10) Patent No.: US 12,299,377 B2
(45) Date of Patent: May 13, 2025

(54) TEXT CONTENT PRESENTATION METHOD AND APPARATUS, AND COMPUTING DEVICE AND STORAGE MEDIUM

(71) Applicant: BEIJING BYTEDANCE NETWORK TECHNOLOGY CO., LTD., Beijing (CN)

(72) Inventors: Qi Deng, Beijing (CN); Yifan Tan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/326,456

(22) Filed: May 31, 2023

(65) Prior Publication Data

US 2023/0306186 A1      Sep. 28, 2023

Related U.S. Application Data

(63) Continuation-in-part of application No. PCT/CN2022/071862, filed on Jan. 13, 2022.

(30) Foreign Application Priority Data

Feb. 9, 2021   (CN) .......................... 202110175954.6

(51) Int. Cl.
*G06F 17/00*  (2019.01)
*G06F 16/34*  (2019.01)
*G06F 40/106* (2020.01)

(52) U.S. Cl.
CPC ............ *G06F 40/106* (2020.01); *G06F 16/34* (2019.01)

(58) Field of Classification Search
CPC ...... G06F 40/106; G06F 16/34; G06F 16/972; G06F 40/103; G06F 40/169; G06F 40/166; G06F 16/9535; G06F 40/186
(Continued)

(56) References Cited

U.S. PATENT DOCUMENTS

| 6,584,479 B2 * | 6/2003 | Chang ................... G06F 40/103 |
|---|---|---|
| | | 715/705 |
| 2002/0010707 A1 | 1/2002 | Chang et al. |

(Continued)

FOREIGN PATENT DOCUMENTS

| CN | 107831982 A | 3/2018 |
|---|---|---|
| CN | 111339742 A | 6/2020 |

(Continued)

OTHER PUBLICATIONS

China National Intellectual Property Administration, Office Action and Search Report Issued in Application No. 202110175954.6, Dec. 23, 2024, 26 pages.

*Primary Examiner* — Jason T Edwards

(74) *Attorney, Agent, or Firm* — Alleman Hall & Tuttle LLP

(57) ABSTRACT

Provided are text content presentation method and apparatus, computing device and storage medium. The method comprises: acquiring a text to be presented that comprises multiple pieces of text contents, and a target reading auxiliary text corresponding to at least one piece of target text content among the multiple pieces of text content; and in response to presenting the target text content on a reading page, presenting, in a first area of the reading page, the target reading auxiliary text corresponding to the target text content, wherein the position of the first area in the reading page is related to the position of the target text content in the reading page.

20 Claims, 7 Drawing Sheets acquiring a text to be presented including multiple pieces of text contents, and a target reading auxiliary text corresponding to at least one piece of target text content in the multiple pieces of text contents — S101 in response to presenting the target text content on a reading page, presenting a target reading auxiliary text corresponding to the target text content in a first area of the reading page, wherein, the first area is located at a first position in the reading page, and is related to a second position of the target text content in the reading page — S102

(58) Field of Classification Search
USPC .......................................................... 715/246
See application file for complete search history.

(56) References Cited

U.S. PATENT DOCUMENTS

| | | | | |
|---|---|---|---|---|
| 2013/0241952 | A1* | 9/2013 | Richman | ................ G06Q 30/00 |
| | | | | 345/619 |
| 2016/0224557 | A1* | 8/2016 | Chi | ....................... G06F 16/972 |
| 2018/0081866 | A1* | 3/2018 | DiTomaso | ............ G06F 40/117 |
| 2019/0179501 | A1 | 6/2019 | Seeley et al. | |

FOREIGN PATENT DOCUMENTS

| | | |
|---|---|---|
| CN | 111488097 A | 8/2020 |
| CN | 111723315 A | 9/2020 |
| CN | 112241503 A | 1/2021 |
| CN | 112328927 A | 2/2021 |

\* cited by examiner acquiring a text to be presented including multiple pieces of text contents, and a target reading auxiliary text corresponding to at least one piece of target text content in the multiple pieces of text contents — S101 in response to presenting the target text content on a reading page, presenting a target reading auxiliary text corresponding to the target text content in a first area of the reading page, wherein, the first area is located at a first position in the reading page, and is related to a second position of the target text content in the reading page — S102

FIG. 1

TEXT CONTENT PRESENTATION METHOD AND APPARATUS, AND COMPUTING DEVICE AND STORAGE MEDIUM

CROSS-REFERENCE OF RELATED APPLICATION

The present application is a national phase application of PCT/CN2022/071862 filed Jan. 13, 2022 which claims the priority of a Chinese patent application No. 202110175954.6 filed on Feb. 9, 2021, entitled "TEXT CONTENT PRESENTATION METHOD AND APPARATUS, AND COMPUTING DEVICE AND STORAGE MEDIUM", which is hereby incorporated by reference in its entirety.

FIELD OF THE INVENTION

The present disclosure relates to the technical field of electronic information technology, and in particular, to a text content presentation method, apparatus, computing device and storage medium.

BACKGROUND

With the advent of the network era, E-books have gradually entered the lives of people, which not only eliminates the need for heavy-load paper books, but also reduces the demand for papers for making books to a certain extent, thereby reducing tree felling and achieving the purpose of energy saving and environmental protection.

At present, the form of E-book presenting books on the user's smart terminal is not much different from that of traditional paper books, both present corresponding book texts on each page. Therefore, it is easy for users to feel boring during reading and the immersive sense is not strong. In order to solve the above problems, some portal websites or E-book application programs will set up some comment areas for users to view other users' comments while reading, thereby enhancing the fun of the reading process and improving the immersive sense of reading.

However, some portal websites or E-book applications usually place the comment contents at a specific comment position, or provide a certain comment interface for users to view. However, the above methods often require the user to slide to the comment position or click the corresponding comment entry button so as to view comments. Therefore, the efficiency for users to obtain comment contents is low, and the user experience is not good.

DISCLOSURE OF THE INVENTION

Embodiments of the present disclosure at least provide a text content presentation method, apparatus, computing device, and storage medium.

In a first aspect, an embodiment of the present disclosure provides a text content presentation method, the method comprising:
 acquiring a text to be presented including multiple pieces of text contents, and a target reading auxiliary text corresponding to at least one piece of target text content in the multiple pieces of text contents;
 in response to presenting the target text content on a reading page, presenting a target reading auxiliary text corresponding to the target text content in a first area of the reading page, wherein, the first area is located at a first position in the reading page, and is related to a second position of the target text content in the reading page.

In some embodiments of the present disclosure, in response to presenting the target text content on a reading page, presenting a target reading auxiliary text corresponding to the target text content in a first area of the reading page, comprises:
 in response to presenting the target text content on the reading page, determining the second position of the target text content in the reading page, and the first position in the reading page corresponding to the second position, based on typography information about the multiple pieces of text contents and the target reading auxiliary text, and
 presenting the target reading auxiliary text corresponding to the target text content in the first area at the first position.

In some embodiments of the present disclosure, in response to presenting the target text content on the reading page, determining the second position of the target text content in the reading page, and the first position in the reading page corresponding to the second position, based on typography information of the multiple pieces of text contents and the target reading auxiliary text, comprises:
 generating the typography information about the multiple pieces of text contents and the target reading auxiliary text, based on text presentation amount in the reading page, preset auxiliary text presentation amount in the reading auxiliary text, and the target text content corresponding to the target reading auxiliary text, and
 determining the second position of the target text content in the reading page and the first position corresponding to the second position, based on typography information.

In some embodiments of the present disclosure, in response to presenting the target text content on a reading page, presenting a target reading auxiliary text corresponding to the target text content in a first area of the reading page, comprises:
 in response to presenting the target text content on the reading page, acquiring pre-typography information about the multiple pieces of text contents, wherein the pre-typography information is generated based on text presented amount in the reading page;
 determining the second position of the target text content in the reading page based on the pre-typography information, and determining the corresponding first position in the reading page based on the second position;
 determining a first area at the first position based on a preset auxiliary text presentation amount of the reading auxiliary text, and presenting the reading auxiliary text in the first area.

In some embodiments of the present disclosure, presenting a target reading auxiliary text corresponding to the target text content in a first area of the reading page comprises:
 determining character presentation attribute of the reading auxiliary text, and area presentation attribute of the first area; and
 displaying the first area in the reading page based on the character presentation attribute and the area presentation attribute, and presenting the target reading auxiliary text corresponding to the target text content in the first area of the reading page.

In some embodiments of the present disclosure, the method further comprising:

for any piece of text content, presenting an auxiliary identifier of the text content at a third position in the reading page; wherein, the auxiliary identifier is used to characterize the auxiliary content corresponding to the piece of text content, and the third position is related to the second position of the piece of text content in the reading page, and in response to the auxiliary identifier of any piece of text content being triggered, presenting the reading auxiliary text corresponding to the piece of text content.

In some embodiments of the present disclosure, the method further comprising:

presenting key information of the target reading auxiliary text in the first area in the reading page;

in respondence to a trigger event for the key information, presenting the target reading auxiliary text corresponding to the key information.

In a second aspect, the embodiments of the present disclosure provide a text content presentation method, the method comprising:

in response to a text acquisition request, acquiring a text to be presented including multiple pieces of text contents corresponding to the request, and candidate reading auxiliary texts corresponding to respective pieces of text contents, determining a target text content based on the multiple pieces of text contents and candidate reading auxiliary texts corresponding to respective pieces of text contents, determining a target reading auxiliary text corresponding to the target text content from the candidate reading auxiliary texts corresponding to the target text content, and sending the text to be presented, and information indicating presentation position of the target text content and the target reading auxiliary text in the reading page, to a terminal.

In some embodiments of the present disclosure, determining a target text content based on the multiple pieces of text contents and candidate reading auxiliary texts corresponding to respective pieces of text contents comprises:

dividing the multiple pieces of text contents according to interaction information about the multiple pieces of text contents, to obtain at least one text set including multiple pieces of subsequent text contents;

determining the target text content in each text set to be assisted.

In some embodiments of the present disclosure, determining the target text content in each text set to be assisted comprises:

determining text content in each text set located at a preset position, and using the text content at the preset position as the target text content to be assisted, or, determining text value of each piece of text content in each text set, and using a text content with text value is used as the target text content to be assisted.

In some embodiments of the present disclosure, wherein determining a target reading auxiliary text corresponding to the target text content from the candidate reading auxiliary texts corresponding to the target text content comprises:

determining auxiliary value of each piece of reading auxiliary text in the candidate reading auxiliary texts corresponding to the target text content, wherein, the auxiliary value is determined based on interaction data of the candidate reading auxiliary text;

selecting a reading auxiliary text with the auxiliary value as the target reading auxiliary text associated with the target text content.

In some embodiments of the present disclosure, the method further comprises:

selecting a target reading auxiliary text with auxiliary value from the candidate reading auxiliary texts corresponding to respective pieces of text contents;

determining the target text content to be assisted in each text set based on correlation degree between the target reading auxiliary text and each piece of text content.

In some embodiments of the present disclosure, determining the target text content to be assisted in each text set based on correlation degree between the target reading auxiliary text and each piece of text content, comprising:

if the target reading auxiliary text matches the multiple pieces of text contents, determining the correlation degree between the target reading auxiliary text and each piece of text content, and using a text content with the highest correlation degree as the target text content corresponding to the target reading auxiliary text.

In some embodiments of the present disclosure, the method further comprises:

if there are multiple target reading auxiliary texts corresponding to the same text set, then selecting one or more target reading auxiliary texts with the highest auxiliary value as the target reading auxiliary text corresponding to the text set.

In some embodiments of the present disclosure, the method further comprises:

acquiring the reading auxiliary text corresponding to each piece of text content, and determining the reading auxiliary text amount corresponding to each piece of text content;

sending the reading auxiliary text and the reading auxiliary text amount to the terminal.

In some embodiments of the present disclosure, the method further comprises:

analyzing the target reading auxiliary text to obtain key information of the target reading auxiliary text;

sending the key information to the terminal.

In a third aspect, a text content presentation apparatus, said apparatus comprising:

a first acquisition module, configured to acquire a text to be presented including multiple pieces of text contents, and a target reading auxiliary text corresponding to at least one piece of target text content in the multiple pieces of text contents;

a first presentation module, configured to, in response to presenting the target text content on a reading page, present a target reading auxiliary text corresponding to the target text content in a first area of the reading page, wherein, the first area is located at a first position in the reading page, and is related to a second position of the target text content in the reading page.

In some embodiments of the present disclosure, the first presentation module comprises:

a first determination unit, configured to, in response to presenting the target text content on the reading page, determine the second position of the target text content in the reading page, and the first position in the reading page corresponding to the second position, based on typography information about the multiple pieces of text contents and the target reading auxiliary text, and a presentation unit, configured to present the target reading auxiliary text corresponding to the target text content in the first area at the first position.

In some embodiments of the present disclosure, the first determination unit is specifically configured to:

generate the typography information about the multiple pieces of text contents and the target reading auxiliary text, based on text presentation amount in the reading page, preset auxiliary text presentation amount in the reading auxiliary text, and the target text content corresponding to the target reading auxiliary text, and determine the second position of the target text content in the reading page and the first position corresponding to the second position, based on typography information.

In some embodiments of the present disclosure, the first presentation module is specifically configured to:

in response to presenting the target text content on the reading page, acquire pre-typography information about the multiple pieces of text contents, wherein the pre-typography information is generated based on text presented amount in the reading page;

determine the second position of the target text content in the reading page based on the pre-typography information, and determine the corresponding first position in the reading page based on the second position;

determine a first area at the first position based on a preset auxiliary text presentation amount of the reading auxiliary text, and present the reading auxiliary text in the first area.

In some embodiments of the present disclosure, the presentation unit is specifically configured to:

determine character presentation attribute of the reading auxiliary text, and area presentation attribute of the first area; and display the first area in the reading page based on the character presentation attribute and the area presentation attribute, and present the target reading auxiliary text corresponding to the target text content in the first area of the reading page.

In some embodiments of the present disclosure, the apparatus further comprising:

a second presentation module, configured to, for any piece of text content, present an auxiliary identifier of the text content at a third position in the reading page; wherein, the auxiliary identifier is used to characterize the auxiliary content corresponding to the piece of text content, and the third position is related to the second position of the piece of text content in the reading page, and a third presentation module, configured to, in response to the auxiliary identifier of any piece of text content being triggered, present the reading auxiliary text corresponding to the piece of text content.

In some embodiments of the present disclosure, the apparatus further comprising:

a fourth presentation module, configured to present key information of the target reading auxiliary text in the first area in the reading page;

a fifth presentation module, configured to, in respondence to a trigger event for the key information, present the target reading auxiliary text corresponding to the key information.

In a fourth aspect of the description, a text content presentation apparatus, comprising:

a second acquisition module, configured to, in response to a text acquisition request, acquire a text to be presented including multiple pieces of text contents corresponding to the request, and candidate reading auxiliary texts corresponding to respective pieces of text contents, a first determination module configured to determine a target text content based on the multiple pieces of text contents and candidate reading auxiliary texts corresponding to respective pieces of text contents, a second determination module configured to determine a target reading auxiliary text corresponding to the target text content from the candidate reading auxiliary texts corresponding to the target text content, and a first sending module configured to send the text to be presented, and information indicating presentation position of the target text content and the target reading auxiliary text in the reading page, to a terminal.

In some embodiments of the present disclosure, the first determination module comprises:

a division unit configured to divide the multiple pieces of text contents according to interaction information about the multiple pieces of text contents, to obtain at least one text set including multiple pieces of subsequent text contents;

a second determination unit configured to determine the target text content in each text set to be assisted.

In some embodiments of the present disclosure, the second determination unit is specifically configured to:

determine text content in each text set located at a preset position, and use the text content at the preset position as the target text content to be assisted, or, determine text value of each piece of text content in each text set, and use a text content with text value is used as the target text content to be assisted.

In some embodiments of the present disclosure, the second determination module is specifically configured to:

determine auxiliary value of each piece of reading auxiliary text in the candidate reading auxiliary texts corresponding to the target text content, wherein, the auxiliary value is determined based on interaction data of the candidate reading auxiliary text;

select a reading auxiliary text with the auxiliary value as the target reading auxiliary text associated with the target text content.

In some embodiments of the present disclosure, the apparatus further comprising:

a first selection module configured to select a target reading auxiliary text with auxiliary value from the candidate reading auxiliary texts corresponding to respective pieces of text contents;

a third determination module configured to determine the target text content to be assisted in each text set based on correlation degree between the target reading auxiliary text and each piece of text content.

In some embodiments of the present disclosure, the third determination module is specifically configured to:

if the target reading auxiliary text matches the multiple pieces of text contents, determine the correlation degree between the target reading auxiliary text and each piece of text content, and use a text content with the highest correlation degree as the target text content corresponding to the target reading auxiliary text.

In some embodiments of the present disclosure, the third determination module is further configured to:

if there are multiple target reading auxiliary texts corresponding to the same text set, then select one or more target reading auxiliary texts with the highest auxiliary value as the target reading auxiliary text corresponding to the text set.

In some embodiments of the present disclosure, further comprising:
a third acquisition module configured to acquire the reading auxiliary text corresponding to each piece of text content, and determine the reading auxiliary text amount corresponding to each piece of text content;
a second sending module configured to send the reading auxiliary text and the reading auxiliary text amount to the terminal.

In some embodiments of the present disclosure, further comprising:
an analysis module configured to analyze the target reading auxiliary text to obtain key information of the target reading auxiliary text;
a third sending module configured to send the key information to the terminal.

According to a fifth aspect, an embodiment of the present disclosure further provides a computing device, comprising a processor, and a memory, wherein the memory stores machine-readable instructions executable by the processor, the processor is configured to execute the machine-readable instructions stored in the memory, and the machine-readable instructions, when executed by the processor, cause executed of the steps in the first aspect or any possible implementation of the first aspect.

According to a sixth aspect, an embodiment of the present disclosure further provides a computer-readable storage medium storing a computer program thereon, and the computer program, when running on the processor, causes executed of the steps in the first aspect or any possible implementation of the first aspect.

In a seventh aspect, an embodiment of the present disclosure further provides a computing device, comprising a processor, and a memory, wherein the memory stores machine-readable instructions executable by the processor, the processor is configured to execute the machine-readable instructions stored in the memory, and the machine-readable instructions, when executed by the processor, cause executed of the steps in the second aspect or any possible implementation of the second aspect.

In an eighteen aspect, an embodiment of the present disclosure further provides a computer-readable storage medium storing a computer program thereon, and the computer program, when running on the processor, causes executed of the steps in the second aspect or any possible implementation of the second aspect.

In a ninth aspect, an embodiment of the present disclosure further provides a computer program product carrying program codes, wherein instructions included in the program codes, when executed by a computer, cause the computer to implement the method steps in the first aspect or any possible implementation of the first aspect, or the method steps in the second aspect or any possible implementation of the second aspect.

In order to make the above objects, features, and advantages of the present disclosure more obvious and understandable, some preferable embodiments will be enumerated and described in detail below with reference to the accompanying drawings hereinafter.

DESCRIPTION OF THE DRAWINGS

In order to more clearly illustrate the technical solutions of embodiments of the present disclosure, the accompanying drawings that need to be used in the embodiments are briefly described below, and the drawings herein are incorporated in and constitute a part of this specification, and these drawings illustrate some embodiments according to the present disclosure, and together with the description, serve to explain the technical solutions of the present disclosure. It should be understood that the following drawings illustrate only certain embodiments of the present disclosure, and therefore should not be considered as limiting the scope of the present disclosure, and for those skilled in the art, other related drawings may be obtained according to these drawings without involving any inventive effort.

FIG. 1 shows a flow chart of a text content presentation method according to an embodiment of the present disclosure;

DETAILED DESCRIPTION OF PREFERRED EMBODIMENTS

Figure 2:
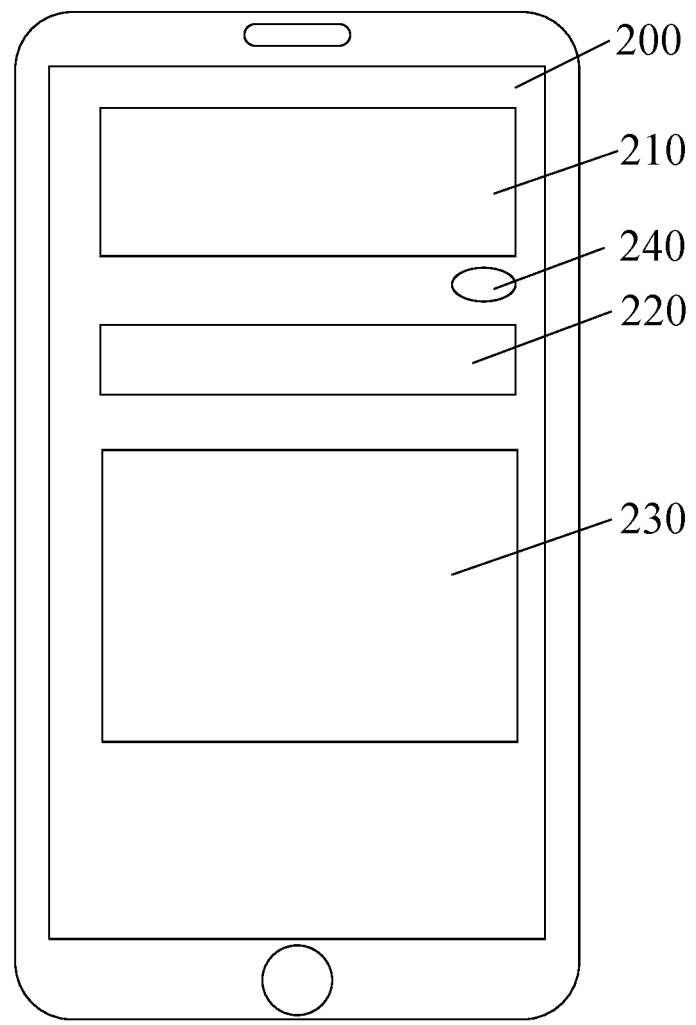
FIG. 2 shows a schematic diagram of presenting target text content and target reading auxiliary text according to an embodiment of the present disclosure.

In order to make the objectives, technical solutions and advantages of the embodiments of the present disclosure clearer, the technical solutions in the embodiments of the present disclosure will be clearly and completely described below in conjunction with the drawings in the embodiments of the present disclosure. It is obvious that the described embodiments are only a part of the embodiments of the present disclosure, instead of all the embodiments. Generally, the components of embodiments of the present disclosure described and illustrated herein may be arranged and designed in a variety of different configurations. Therefore, the following detailed description of embodiments of the present disclosure is not intended to limit the scope of the disclosure as claimed, but merely represents selected embodiments of the present disclosure. All other embodiments that can be obtained by those skilled in the art without creative efforts shall fall within the protection scope of the present disclosure.

It should be noted that like numerals and letters denote similar items in the following figures, therefore, once an item is defined in one figure, it does not require further definition and explanation in subsequent figures. The term "and/or" herein only describes an association relationship, which means that there can be three kinds of relationships, for example, A and/or B can mean: only A exists, both A and B exist, and only B exists. In addition, the term "at least one" herein means any one or any combination of at least two, for example, including at least one of A, B, and C, which may mean including any one or more elements selected from a set comprised of A, B and C.

After research, it is found that at present, some portal websites or E-book applications usually place the comment contents at a specific comment position, or provide a certain comment interface for users to view. However, the above methods often require the user to slide to the comment position or click the corresponding comment entry button so as to view comments. Therefore, the efficiency for users to obtain comment contents is low, and the user experience is not good.

Based on the above research, this disclosure provides a text content presentation method, and by incorporating the selected target reading auxiliary text into the corresponding area in the reading page, the user can intuitively acquire the auxiliary reading content and improve the user's efficiency to acquire the auxiliary reading content, and improve the user's immersive sense during reading.

In order to facilitate understanding of embodiments of the present disclosure, firstly, a text content presentation method disclosed in the embodiments of the present disclosure will be described in detail, an executive subject of the text content presentation method provided in the embodiments of the present disclosure is generally a computing device having certain computing capability, and the computing device comprises, for example, a terminal device or server or any other processing device, the terminal device may be a user equipment (UE), a mobile device, a user terminal, a terminal, a personal digital assistant (PDA), a handheld device, a computing device, a vehicle-mounted device, a wearable device, and the like. In some possible implementations, the text content presentation method may be implemented by invoking, by a processor, computer-readable instructions stored in a memory.

Referring to FIG. 1, it is a flowchart of a text content presentation method according to an embodiment of the present disclosure, the method includes steps S101 to S102, wherein:

S101: acquiring a text to be presented including multiple pieces of text contents, and a target reading auxiliary text corresponding to at least one piece of target text content in the multiple pieces of text contents.

In this step, the to-be-presented text that wants to be presented and the reading auxiliary text for at least one target text content in the to-be-presented text can be obtained first.

Among them, the text to be presented can be various forms of electronic text content such as serial novels and electronic magazines, etc. Correspondingly, the reading auxiliary text can be the comment content that the user comments on in a fixed area corresponding to the text to be presented, or the comment content that the user comments on the specific content of the text to be presented, or the comment content issued by the user according to a preset comment rules for the text to be presented, when the user reads the text to be presented.

Exemplarily, the acquisition of comment content includes the following methods: one method may be at the end of the full text of the text to be presented, or at the chapter end corresponding to each chapter, there may exist a comment area for users to make comments, and acquire the user's comments on the full text or full chapter from the comment area. Another method can be that when the user reads the content of interest, the user can comment on a paragraph corresponding to the content, specifically, the user can comment in the comment area corresponding to the paragraph, and acquire user's comments on the paragraph from the comment area corresponding to the paragraph. There is also a method that the user can make comments according to a preset comment rule, a variety of manners of acquiring the reading auxiliary text, such as, users can post one comment every time they read 10,000 words or 100 paragraphs, and correspondingly, the comment contents can be acquired from the comment area.

In the embodiment of the present disclosure, since the text to be presented is an online document, the reading auxiliary text also carries comments, likes, replies, forwarding, etc. performed by the user on the text to be presented or the target text content of the text to be presented.

S102: in response to presenting the target text content on a reading page, presenting a target reading auxiliary text corresponding to the target text content in a first area of the reading page, wherein, the first area is located at a first position in the reading page, and is related to a second position of the target text content in the reading page.

In this step, after determining multiple paragraphs of text contents in the text to be presented and a reading auxiliary text corresponding to at least one target text content in the multiple paragraphs of text contents, the target text content and the reading auxiliary text are typesetted in accordance with a certain typography rule, and presented on a reading page.

In an embodiment of the present disclosure, since different presentation apparatuses have different sizes, and users may have different requirements for display font size and display spacing, it is necessary to typeset the texts to be presented and corresponding reading auxiliary texts for different presentation apparatuses, and present them on the reading interface of the presentation apparatus.

Specifically, in response to presenting the target text content on a reading page, presenting a target reading auxiliary text corresponding to the target text content in a first area of the reading page, comprises:

in response to presenting the target text content on the reading page, determining the second position of the target text content in the reading page, and the first position in the reading page corresponding to the second position, based on typography information about the multiple pieces of text contents and the target reading auxiliary text, and presenting the target reading auxiliary text corresponding to the target text content in the first area at the first position.

Referring to FIG. 2, which is a schematic diagram of presenting target text content and reading auxiliary text according to an embodiment of the present disclosure. As shown in FIG. 2, 200 represents the reading interface, 210 represents the second position of the target text content in the reading page, and 220 represents the first position of the reading auxiliary text presented on the reading interface. It should be pointed out that the arrangement relationship between the first and second positions is only an example, and they can also adopt other appropriate arrangements. For example, depending on the user's reading habit and/or the setting of the presentation apparatus, the second position may be located on the side of the first position, such as left or right.

Specifically, determining the second position of the target text content in the reading page, and the first position in the reading page corresponding to the second position, based on typography information of the multiple pieces of text contents and the target reading auxiliary text, comprises:

generating the typography information about the multiple pieces of text contents and the target reading auxiliary text, based on text presentation amount in the reading page, preset auxiliary text presentation amount in the reading auxiliary text, and the target text content corresponding to the target reading auxiliary text, and determining the second position of the target text content in the reading page and the first position corresponding to the second position, based on typography information.

Specifically, the typography information can be used for mixed typography of the multiple pieces of text contents and the target reading auxiliary text.

Exemplarily, based on reading interface attributes of the presentation apparatus and corresponding settings, such as: screen size, set font size, word spacing, etc., pre-typesetting is performed on the multiple paragraphs of text contents of the text to be presented. Specifically, when the reading interface can display 20 lines of texts, each line of text includes 20 words, and the line spacing is single line spacing, and the paragraph spacing is double line spacing, multiple paragraphs of text contents of the text to be presented can be typographyed based on the above configuration information. For a selected target reading auxiliary text, it can set a display rule corresponding to the target reading auxiliary text, for example, only displaying two lines of target reading auxiliary text, and based on this, determine information about typesetting for multiple pieces of text contents and the target reading auxiliary text, and thus determine the second position of the target text content in the reading page, and the first position in the reading page corresponding to the second position, and present the target reading auxiliary text corresponding to the target text content in the first area at the first position.

Exemplarily, since in the embodiments of the present disclosure, it is desirable to add the corresponding reading auxiliary text at the corresponding position of the target text content, therefore, the first area where the corresponding reading auxiliary text is presented may be determined based on the presentation position of the target text content. Specifically, as shown in FIG. 2, the presentation position of the target text content in the reading page is 210, then the area after the presentation position 210 of the target text content in the reading page can be determined as the corresponding position for presenting the reading auxiliary text. Meanwhile, considering that there may be a certain separate area between the target text content and the reading auxiliary text, the position which is one or several lines away from the target text content can be determined as the first area 220 where the reading auxiliary text is presented on the reading interface.

In another embodiment of the present disclosure, in response to presenting the target text content on a reading page, presenting a target reading auxiliary text corresponding to the target text content in a first area of the reading page, comprises:

in response to presenting the target text content on the reading page, acquiring pre-typography information about the multiple pieces of text contents, wherein the pre-typography information is generated based on text presented amount in the reading page;

determining the second position of the target text content in the reading page based on the pre-typography information, and determining the corresponding first position in the reading page based on the second position;

determining a first area at the first position based on a preset auxiliary text presentation amount of the reading auxiliary text, and presenting the reading auxiliary text in the first area.

In some embodiments, due to the display limitation of the reading interface and in order to reduce the interference of the reading auxiliary text in the user's reading process, the specific display content of the target reading auxiliary text may also be adjusted. Exemplarily, when it is only desired to display one or two lines of reading auxiliary texts, if the reading auxiliary texts have fewer contents, then the entire content of the reading auxiliary texts can be directly presented; if the reading auxiliary texts have more contents, then the folded contents of the reading auxiliary texts, such as the first two lines of the reading auxiliary contents, or the summary content or keyword content of the reading auxiliary text, can be presented.

In some embodiments, it is possible to typeset subsequent texts after the target text content. In particular, it is possible to typeset the subsequent texts after the target text content in the multiple pieces of text contents, based on the text presentation volume of the area after the first area.

Specifically, typesetting the subsequent texts after the target text content in the multiple pieces of text contents, based on the presentation position and the first area comprises:

determining the text presentation amount of the area after the first area in the reading page based on the position and the area size of the first area; typesetting the subsequent texts after the target text content in the multiple pieces of text contents based on the text presentation amount of the area after the first area in the reading page.

Exemplarily, referring to FIG. 2, 230 indicates the position of the text after the reading auxiliary text presented in the reading interface. After determining the presentation position 210 of the target text content in the reading page and the first area 220 in the reading interface where the reading auxiliary text is presented, the presentation position 230 for the subsequent text after the target text content can be after first area 220 in the reading page. Meanwhile, in order to distinguish the target reading auxiliary text from the subsequent text, a certain separate area can be set, so it can be determined that a position that is one or several lines away from the first area 220 of the reading auxiliary text is the position 230 in the reading page for the subsequent text after the target text content.

In this embodiment, after determining the typography information about pre-typesetting and the typography information about re-typesetting, that is, the presentation position 210 in the reading page for the target text content, the first area 220 on the reading interface where the reading auxiliary text is presented, the presentation position 230 in the reading page for the subsequent text after the target text content, the text to be presented including the target text content can be presented in the reading page, and the reading auxiliary text can be presented in the first area.

In another embodiment of the present disclosure, presenting a target reading auxiliary text corresponding to the target text content in a first area of the reading page comprises:

determining character presentation attribute of the reading auxiliary text, and area presentation attribute of the first area; and displaying the first area in the reading page based on the character presentation attribute and the area presentation attribute, and presenting the target reading auxiliary text corresponding to the target text content in the first area of the reading page.

Wherein, the text presentation attributes include at least one of font, font size, text color, text background color, and text special effects. The area presentation attributes include at least one of area background color, area special effect, area style, and the like.

Exemplarily, in order to distinguish the reading auxiliary text from the body content of the text to be presented, attribute adjustments can be performed on the reading auxiliary text, for example, reducing the font size of the reading auxiliary text, changing the font of the reading auxiliary text, or changing the font color of the reading auxiliary text or increasing the background color of the first area corresponding to the reading auxiliary text, or add text special effects to the reading auxiliary text, such as flashing, tilting, shadowing, etc., so as to highlight the content of the reading auxiliary text and distinguish it from the main body content.

In another embodiment of the present disclosure, in order to enable the user to acquire more reading auxiliary contents, the method further includes:

for any piece of text content, presenting an auxiliary identifier of the text content at a third position in the reading page; wherein, the auxiliary identifier is used to characterize the auxiliary content corresponding to the piece of text content, and the third position is related to the second position of the piece of text content in the reading page, and in response to the auxiliary identifier of any piece of text content being triggered, presenting the reading auxiliary text corresponding to the piece of text content.

According to an embodiment of the present disclosure, the reading auxiliary content may be different from the reading auxiliary text presented at 220, for example, it may be the content other than the reading auxiliary text, or may be a supplementary content of the reading auxiliary text; or, the reading auxiliary content may even include the reading auxiliary text presented at 220, for example, more detailed contents including the reading auxiliary text and other content.

According to an embodiment of the present disclosure, the auxiliary identifier may be presented in various appropriate ways. For example, the auxiliary identifier is used to characterize the amount of auxiliary texts corresponding to the text content, and the auxiliary text here may or may not include the reading auxiliary text presented at 220. For example, the auxiliary identifier may also be other appropriate numbers of words, symbols, icons and the like.

As shown in FIG. 2, 240 is a corresponding position for presenting the auxiliary identifier of the text content. When the user not only wants to acquire certain reading auxiliary text but also wants to browse other auxiliary information, the auxiliary flag can be triggered, and the auxiliary information corresponding to the text content can be viewed. Specifically, a corresponding mechanism for viewing comments may be set, so that users can acquire auxiliary information content when they want to view comments. According to an embodiment of the present disclosure, the position 240 may be outside the area indicated by 220, and may even be contained within the area indicated by 220, for example at the end of the reading auxiliary text presented in 220.

In another embodiment of the present disclosure, the method also comprises:

presenting key information of the target reading auxiliary text in the first area in the reading page;

in respondence to a trigger event for the key information, presenting the target reading auxiliary text corresponding to the key information.

Wherein, the key information is the key information of the target reading auxiliary text which is acquire by the server analyzing and processing the target reading auxiliary text. The key information may include auxiliary information corresponding to multiple pieces of text content, the amount of auxiliary information corresponding to the target text content, and the like.

As shown in FIG. 2, after acquiring the key information of the target reading auxiliary text, the key information of the target reading auxiliary text corresponding to the target text content can be presented in the reading page corresponding to the text content, and in respondence to a preset trigger mechanism, the target reading auxiliary text corresponding to the triggered key information is presented in the reading page.

Exemplarily, the trigger mechanism may be triggering the target text content and/or the area where the trigger target text content is located. Specifically, after the target text content and/or the area where the target text content is located is triggered, auxiliary information is presented on the reading page, including:

After the target text content is triggered, the auxiliary information corresponding to the target text content is presented in the reading page, and/or, after the target text content is triggered, the auxiliary information based on the triggered target text content is presented in the reading page. For example, after the target text content is triggered, the user's comment content on the target text content can be presented, or the corresponding text content based on the target text content, such as the comment contents for one or more paragraphs (for example, ten paragraphs) of text above and below, can be presented.

After the area where the target text content is located is triggered, the auxiliary information corresponding to the target text content is presented in the reading page, and/or, after the area where the target text content is located is triggered, the auxiliary information based on the triggered target text content is presented in the reading page. For example, after the area where the target text content is located is triggered, the user's comment content on the target text content can be presented, or the corresponding text content based on the target text content, such as the comment contents for one or more paragraphs (for example, ten paragraphs) of text above and below, can be presented.

The embodiment of the present disclosure incorporates a selected target reading auxiliary text to a corresponding area in the reading page, a user can intuitively acquire the reading auxiliary content, thereby improving the efficiency of the user acquiring the reading auxiliary content, and improving immersive feeling of the user during a reading process.

Figure 3:
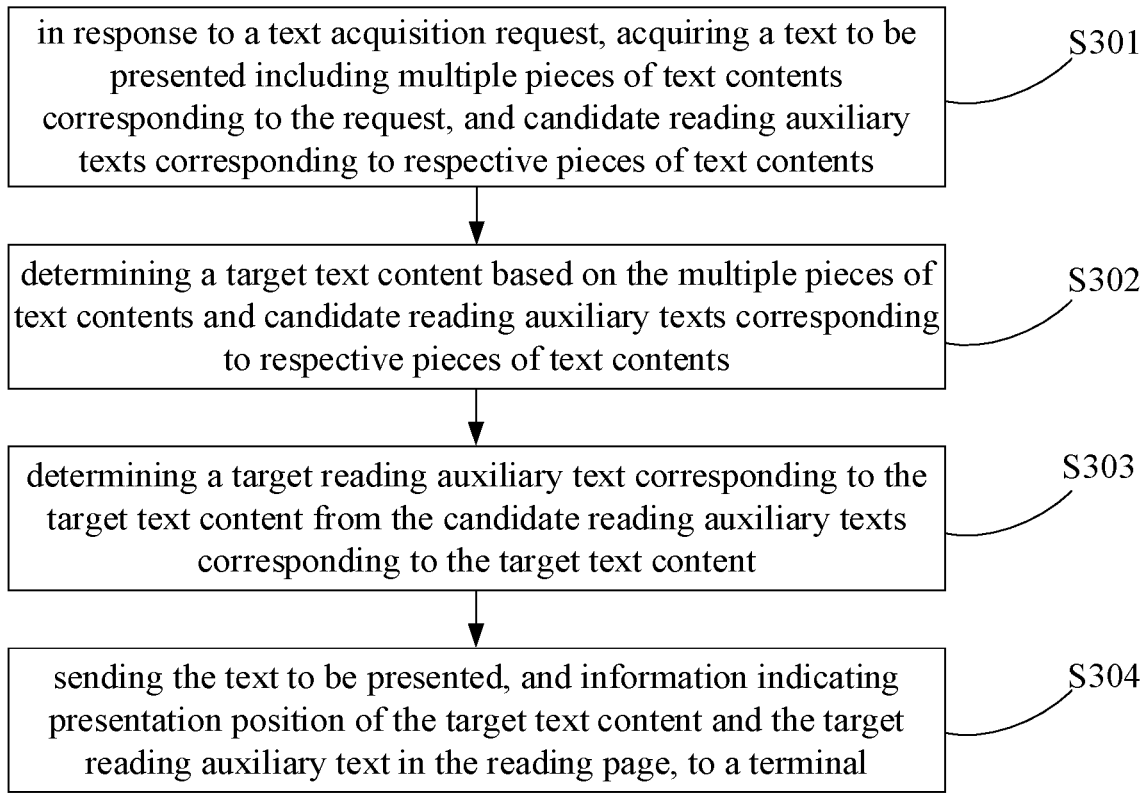
FIG. 3 shows a flow chart of another text content presentation method according to an embodiment of the present disclosure.

Referring to FIG. 3, which is a flow chart of another text content presentation method according to an embodiment of the present disclosure, the method includes steps S301 to S304, wherein:

S301: in response to a text acquisition request, acquiring a text to be presented including multiple pieces of text contents corresponding to the request, and candidate reading auxiliary texts corresponding to respective pieces of text contents, In this step, when the server receives a text acquisition request sent by the terminal, based on the text acquisition request, the server determines the text to be presented including multiple pieces of text contents and a candidate reading auxiliary text corresponding to the multiple pieces of text contents, corresponding to the request.

Wherein, the terminal may be any suitable type of terminal for presenting text content, such as the terminal or terminal device as mentioned above.

Wherein, the description about the text to be presented and the reading auxiliary text is similar to the relevant description in S101, and will not be repeated here.

Exemplarily, the candidate reading auxiliary text is all comment contents sent by the user for the text to be presented, etc.

S302: determining a target text content based on the multiple pieces of text contents and candidate reading auxiliary texts corresponding to respective pieces of text contents.

In this step, based on a certain filtering standard, multiple pieces of text contents and candidate reading auxiliary texts corresponding to respective piece of text content are filtered, so as to determine the target text content.

In the embodiment of the present disclosure, in order to prevent the user from being disturbed by too many reading auxiliary texts, it is usually necessary to control the occurrence frequency of the reading auxiliary text, so as to ensure that the normal reading will not be affected when the user browses the reading auxiliary text, and when it is desired to achieve a certain amount of interaction with the user, the number of corresponding reading auxiliary texts to be added can be increased. Therefore, the multiple pieces of text contents may be divided according to interaction information about the multiple pieces of text contents, to obtain at least one text set including multiple pieces of subsequent text contents, and the target text content to be assisted can be determined based on each text set.

Wherein, the interaction information may include a preset presentation frequency of the reading auxiliary text, a preset interaction frequency with the user, desired interaction popularity, and the like.

Specifically, determining the target text content to be assisted in each text set includes:
  determining the text content in each of the text sets at a preset position, and using the text content at the preset position as the target text content to be assisted, or,
  determining the text value of each text content in each text set, and using the text content with text value as the target text content to be assisted.

Exemplarily, paragraphs in each text set in a fixed order may be determined as the target text content to be assisted. For example, the first paragraph, the last paragraph, or the specific number of paragraph (for example, the tenth paragraph) in each text set are determined as the target text content to be assisted. Alternatively, the text content with textual value is used as the target text content to be assisted, for example: the text content corresponding to words representing a certain story process, such as XXX appeared, XXX left, etc. is the target text content to be assisted.

S303: determining a target reading auxiliary text corresponding to the target text content from the candidate reading auxiliary texts corresponding to the target text content.

In this step, after the target text content to be assisted is determined, the target reading auxiliary text corresponding to the target text content may also be determined from candidate reading auxiliary texts corresponding to the target text content.

Specifically, the target reading auxiliary text associated with the target text content may be determined, including:

determining auxiliary value of each piece of reading auxiliary text in the candidate reading auxiliary texts corresponding to the target text content, wherein, the auxiliary value is determined based on interaction data of the candidate reading auxiliary text;
selecting a reading auxiliary text with the auxiliary value as the target reading auxiliary text associated with the target text content.

Wherein, the interaction data refers to data such as the number of comments, the number of likes, and the number of reposts, etc. by the user for each reading auxiliary text, so as to characterize the user favorite degree, user discussion degree, etc. of each reading auxiliary text, and thereby characterizes the auxiliary value of each piece of reading auxiliary text. After the auxiliary value of the reading auxiliary text is determined, the target reading auxiliary text to be presented can be determined based on preset reading auxiliary text presentation rules, such as presenting one or several reading auxiliary texts.

According to an embodiment of the present disclosure, a threshold value may be preset, and the reading auxiliary text whose auxiliary value is higher than the threshold value may be displayed, or a specific number of reading auxiliary texts among the reading auxiliary texts whose auxiliary value is higher than the threshold value may be displayed, for example, one, a pre-fixed amount, or even all of them.

In another embodiment of the present disclosure, it is also possible to pre-determine the target reading auxiliary text to be presented, and then determine the corresponding target text content. Specifically, including:
  selecting a target reading auxiliary text with auxiliary value from the candidate reading auxiliary texts corresponding to respective pieces of text contents;
  determining the target text content to be assisted in each text set based on correlation degree between the target reading auxiliary text and each piece of text content.

Exemplarily, based on the auxiliary value of each reading auxiliary text in the selected reading auxiliary texts, multiple target reading auxiliary texts to be presented can be determined. And based on the correlation degree between the contents of multiple target reading auxiliary texts and the body content of the text to be presented, it can determine the corresponding target text content to which each target reading auxiliary text is desired to be added.

In another embodiment of the present disclosure, if the contents of the multiple target reading auxiliary texts are highly correlated with the same text set in the text to be presented, it is easy to determine that the multiple target reading auxiliary texts want to be added to the same text set, cause there are many reading auxiliary texts at the text set, which affects the user's reading process. Therefore, it is necessary to filter the target reading auxiliary text and only keep a target number of target reading auxiliary texts. Specifically, if there are multiple target reading auxiliary texts corresponding to the same text set, one or more target reading auxiliary texts with the highest assist value are selected as the target reading auxiliary text corresponding to the text set. In particular, the target reading auxiliary texts may be sorted according to their auxiliary value from high to low, and a first certain number of target reading auxiliary texts may be selected as the target reading auxiliary texts. For example, if the auxiliary value of reading auxiliary text A is very strong, and the auxiliary value of reading auxiliary text B is relative strong, then it is determined that reading auxiliary text A is the target reading auxiliary text corresponding to the text set.

S304: sending the text to be presented, and information indicating presentation position of the target text content and the target reading auxiliary text in the reading page, to a terminal.

In this step, the presentation position information of the determined text to be presented and the corresponding target reading auxiliary text in the reading page can be sent to the terminal, so that the terminal can present the text to be presented on the user terminal based on the received text and corresponding information. Wherein, the presentation position information is the target text content corresponding to the determined target reading auxiliary text, and based on the presentation position information, the terminal can typeset multiple pieces of text content and the target reading auxiliary text based on this information.

Exemplarily, after acquiring the candidate reading auxiliary texts corresponding to the multiple pieces of text contents, it can determine the candidate reading auxiliary texts corresponding to the multiple pieces of text contents, and send the multiple pieces of text contents, at least one reading auxiliary text and the target reading auxiliary text to the terminal, so that the terminal can display it at a corresponding presentation position, and various needs of the user in the reading process can be met.

In another embodiment of the present disclosure, the method further includes:
  acquiring the reading auxiliary text corresponding to each piece of text content, and determining the reading auxiliary text amount corresponding to each piece of text content, and
  performing text content presentation based on the reading auxiliary text and the number of reading auxiliary texts.

In particular, the reading auxiliary text and the number of reading auxiliary texts may be sent to the terminal for presentation.

Specifically, the historical reading auxiliary texts sent by the user for each paragraph of text content stored in a background server can be invoked, and the number of reading auxiliary texts corresponding to each paragraph of the text content can be counted, and sent to the terminal, so that the terminal can select the desired information to display.

In another embodiment of the present disclosure, the method further includes:
  analyzing the target reading auxiliary text to obtain key information of the target reading auxiliary text;
  performing text content presentation based on the key information.

In particular, the key information may be sent to the terminal for presentation.

Wherein, the key information may be keywords corresponding to the target auxiliary text, the number of auxiliary texts corresponding to the target auxiliary text, etc. After extracting the key information corresponding to the target reading auxiliary text, the key information is sent to the terminal, so that the terminal can generate a corresponding display identifier, etc. based on the key information, to facilitate the user's reading process.

In the embodiment of the present disclosure, by selecting the target text content to be assisted and the target reading auxiliary text associated with the target text content, and sending them to the terminal for presentation to the user, the value of the content to be presented can be improved, so that the user can view the most valuable content to enhance user experience and immersive sense.

It shall be understood by those skilled in the art that, in the above-mentioned methods of specific embodiments, the expressed order of respective steps do not mean a strict execution order to constitute any limitation on the implementation process, and the specific execution sequence of respective steps should be determined by their functions and the possible internal logic.

Based on the same inventive concept, the embodiments of the present disclosure further provide a text content presentation apparatus corresponding to the text content presentation method. Since the principle of solving a problem by the apparatus in the embodiments of the present disclosure is similar to the text content presentation method in the embodiments of the present disclosure, the implementation of the apparatus may refer to the implementation of the method, and details are not repeated herein again.

Figure 4:
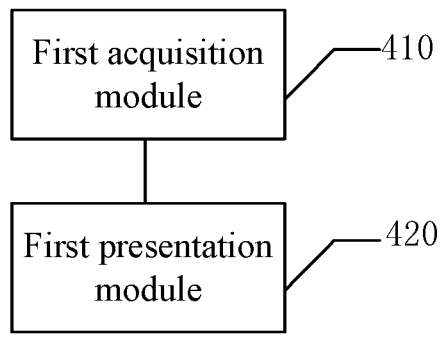
FIG. 4 shows a schematic diagram of a text content presentation apparatus according to an embodiment of the present disclosure.
Figure 5:
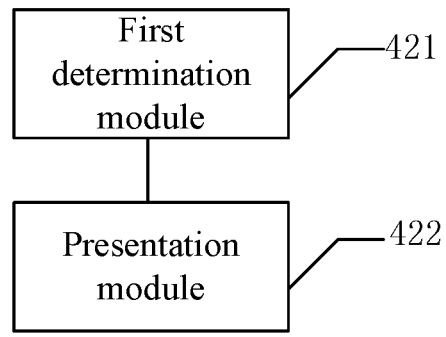
FIG. 5 shows a specific schematic diagram of the first determination module in the text content presentation apparatus according to the embodiment of the present disclosure.
Figure 6:
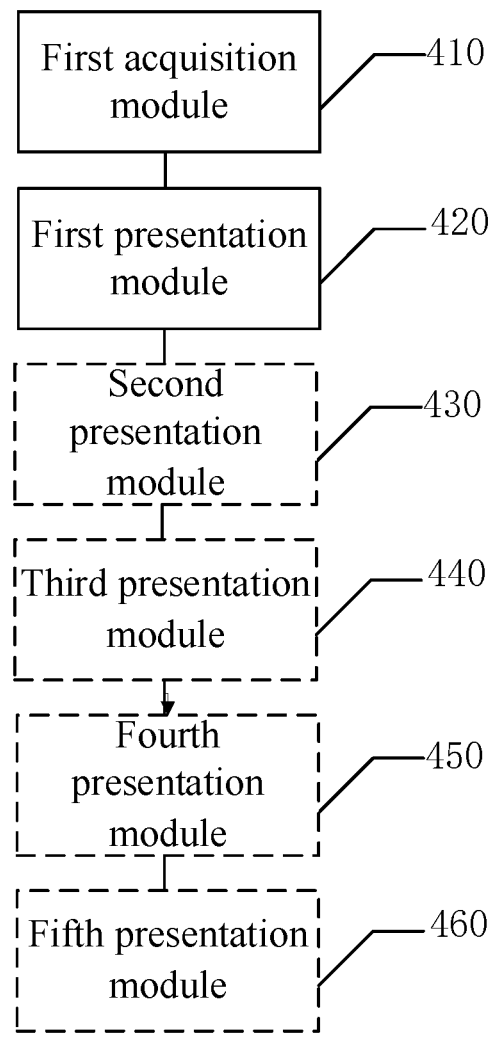
FIG. 6 shows a schematic diagram of another text content presentation apparatus according to an embodiment of the present disclosure.

Referring to FIG. 4, FIG. 5, and FIG. 6, FIG. 4 is a schematic diagram of a text content presentation apparatus according to an embodiment of the present disclosure, FIG. 5 is a specific schematic diagram of a first determination module in a text content presentation apparatus according to an embodiment of the present disclosure, FIG. 6 is a schematic diagram of another text content presentation apparatus according to an embodiment of the present disclosure. Wherein, the terminal includes: a first acquisition module 410, a first presentation module 420; wherein:
  the first acquisition module 410, configured to acquire a text to be presented including multiple pieces of text contents, and a target reading auxiliary text corresponding to at least one piece of target text content in the multiple pieces of text contents;
  the first presentation module 420, configured to, in response to presenting the target text content on a reading page, present a target reading auxiliary text corresponding to the target text content in a first area of the reading page, wherein, the first area is located at a first position in the reading page, and is related to a second position of the target text content in the reading page.

In some embodiments of the present disclosure, the first presentation module 420 comprises:
  a first determination unit 421, configured to, in response to presenting the target text content on the reading page, determine the second position of the target text content in the reading page, and the first position in the reading page corresponding to the second position, based on typography information about the multiple pieces of text contents and the target reading auxiliary text, and
  a presentation unit 422, configured to present the target reading auxiliary text corresponding to the target text content in the first area at the first position.

In some embodiments of the present disclosure, the first determination unit 421 is specifically configured to:
  generate the typography information about the multiple pieces of text contents and the target reading auxiliary text, based on text presentation amount in the reading page, preset auxiliary text presentation amount in the reading auxiliary text, and the target text content corresponding to the target reading auxiliary text, and
  determine the second position of the target text content in the reading page and the first position corresponding to the second position, based on typography information.

Specifically, the typography information can be used for mixed typography of the multiple pieces of text contents and the target reading auxiliary text.

In some embodiments of the present disclosure, the first presentation module 420 is specifically configured to:

in response to presenting the target text content on the reading page, acquire pre-typography information about the multiple pieces of text contents, wherein the pre-typography information is generated based on text presented amount in the reading page;

determine the second position of the target text content in the reading page based on the pre-typography information, and determine the corresponding first position in the reading page based on the second position;

determine a first area at the first position based on a preset auxiliary text presentation amount of the reading auxiliary text, and present the reading auxiliary text in the first area.

In some embodiments of the present disclosure, the presentation unit 422 is specifically configured to:

determine character presentation attribute of the reading auxiliary text, and area presentation attribute of the first area; and display the first area in the reading page based on the character presentation attribute and the area presentation attribute, and present the target reading auxiliary text corresponding to the target text content in the first area of the reading page.

In some embodiments of the present disclosure, as shown in FIG. 6, the apparatus further comprising:

a second presentation module 430, configured to, for any piece of text content, present an auxiliary identifier of the text content at a third position in the reading page; wherein, the auxiliary identifier is used to characterize the auxiliary content corresponding to the piece of text content, and the third position is related to the second position of the piece of text content in the reading page, and a third presentation module 440, configured to, in response to the auxiliary identifier of any piece of text content being triggered, present the reading auxiliary text corresponding to the piece of text content.

In some embodiments of the present disclosure, as shown in FIG. 6, the apparatus further comprising:

a fourth presentation module 450, configured to present key information of the target reading auxiliary text in the first area in the reading page;

a fifth presentation module 460, configured to, in respondence to a trigger event for the key information, present the target reading auxiliary text corresponding to the key information.

The embodiment of the present disclosure adds the selected reading auxiliary text to the corresponding area in the reading page, so that the user can intuitively acquire the auxiliary reading content, improve the efficiency of the user in acquiring the auxiliary reading content, and improve the user's immersive sense in the reading process.

Figure 7:
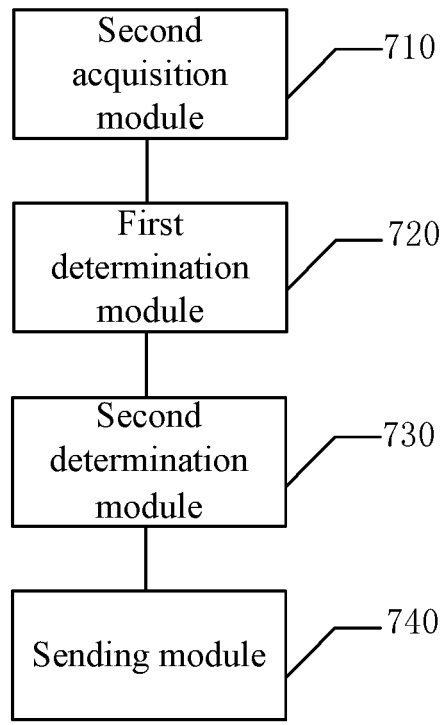
FIG. 7 shows a schematic diagram of a text content presentation apparatus according to an embodiment of the present disclosure.
Figure 8:
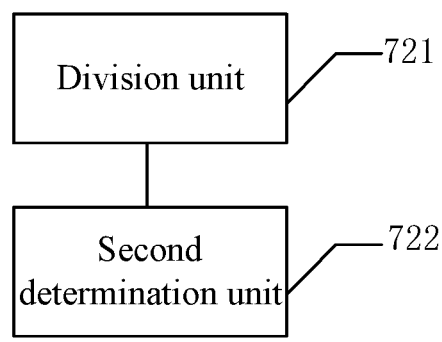
FIG. 8 shows a specific schematic diagram of a second determination module in the text content presentation apparatus according to an embodiment of the present disclosure.
Figure 9:
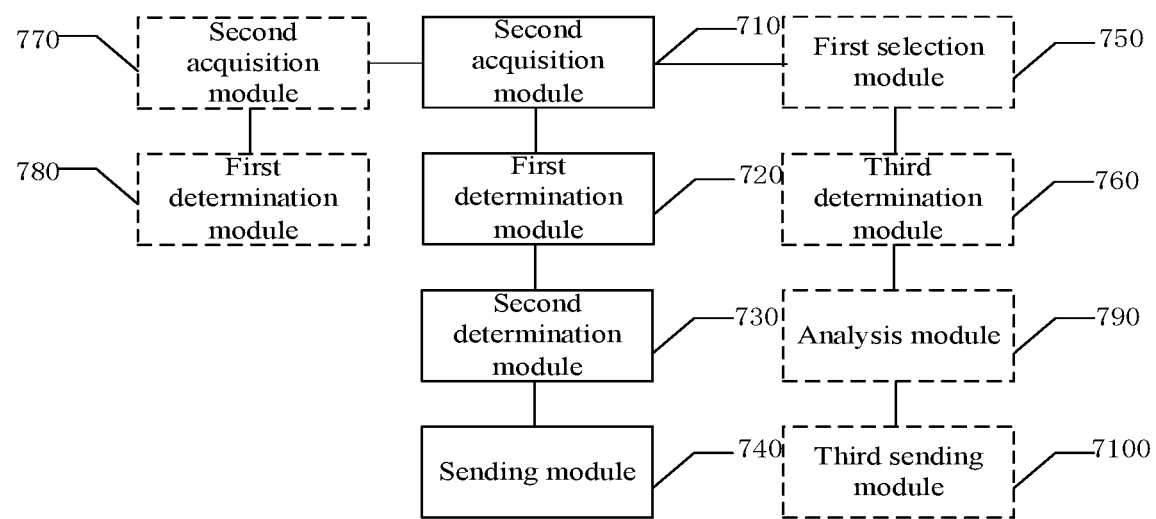
FIG. 9 shows a schematic diagram of another text content presentation apparatus according to an embodiment of the present disclosure.

Referring to FIG. 7, FIG. 8, and FIG. 9, FIG. 7 is a schematic diagram of a text content presentation apparatus according to an embodiment of the present disclosure, FIG. 8 is a specific schematic diagram of a second determination module in the text content presentation apparatus according to an embodiment of the present disclosure, and FIG. 9 is a schematic diagram of another text content presentation apparatus according to an embodiment of the present disclosure. Wherein, a server includes: a second acquisition module 710, a first determination module 720, a second determination module 730, and a sending module 740; wherein, the second acquisition module 710, configured to, in response to a text acquisition request, acquire a text to be presented including multiple pieces of text contents corresponding to the request, and candidate reading auxiliary texts corresponding to respective pieces of text contents, the first determination module 720, configured to determine a target text content based on the multiple pieces of text contents and candidate reading auxiliary texts corresponding to respective pieces of text contents, the second determination module 730, configured to determine a target reading auxiliary text corresponding to the target text content from the candidate reading auxiliary texts corresponding to the target text content, and the first sending module 740, configured to send the text to be presented, and information indicating presentation position of the target text content and the target reading auxiliary text in the reading page, to a terminal.

In some embodiments of the present disclosure, the first determination module 720 comprises:

a division unit 721 configured to divide the multiple pieces of text contents according to interaction information about the multiple pieces of text contents, to obtain at least one text set including multiple pieces of subsequent text contents;

a second determination unit 722 configured to determine the target text content in each text set to be assisted.

In some embodiments of the present disclosure, the second determination unit 722 is specifically configured to:

determine text content in each text set located at a preset position, and use the text content at the preset position as the target text content to be assisted, or, determine text value of each piece of text content in each text set, and use a text content with text value is used as the target text content to be assisted.

In some embodiments of the present disclosure, the second determination module 730 is specifically configured to:

determine auxiliary value of each piece of reading auxiliary text in the candidate reading auxiliary texts corresponding to the target text content, wherein, the auxiliary value is determined based on interaction data of the candidate reading auxiliary text;

select a reading auxiliary text with the auxiliary value as the target reading auxiliary text associated with the target text content.

In some embodiments of the present disclosure, the apparatus further comprising:

a first selection module 750 configured to select a target reading auxiliary text with auxiliary value from the candidate reading auxiliary texts corresponding to respective pieces of text contents;

a third determination module 760 configured to determine the target text content to be assisted in each text set based on correlation degree between the target reading auxiliary text and each piece of text content.

In some embodiments of the present disclosure, the third determination module 760 is specifically configured to:

if the target reading auxiliary text matches the multiple pieces of text contents, determine the correlation degree between the target reading auxiliary text and each piece of text content, and use a text content with the highest correlation degree as the target text content corresponding to the target reading auxiliary text.

In some embodiments of the present disclosure, the third determination module 760 is further configured to:

if there are multiple target reading auxiliary texts corresponding to the same text set, then select one or more target reading auxiliary texts with the highest auxiliary value as the target reading auxiliary text corresponding to the text set.

In some embodiments of the present disclosure, the apparatus further comprising:
- a third acquisition module 770 configured to acquire the reading auxiliary text corresponding to each piece of text content, and determine the reading auxiliary text amount corresponding to each piece of text content;
- a second sending module 780 configured to send the reading auxiliary text and the reading auxiliary text amount to the terminal.

In some embodiments of the present disclosure, the apparatus further comprising:
- an analysis module 790 configured to analyze the target reading auxiliary text to obtain key information of the target reading auxiliary text;
- a third sending module 7100 configured to send the key information to the terminal.

In the embodiment of the present disclosure, by selecting the target text content to be assisted and the target reading auxiliary text associated with the target text content, and sending them to the terminal for presentation to the user, the value of the content to be presented can be improved, so that the user can view the most valuable content to increase user experience and immersion.

With respective to the description about the processing flow of each module in the apparatus and the interaction process between the modules, reference may be made to the related description in the foregoing method embodiments, and details are not repeated in detail herein.

Figure 10:
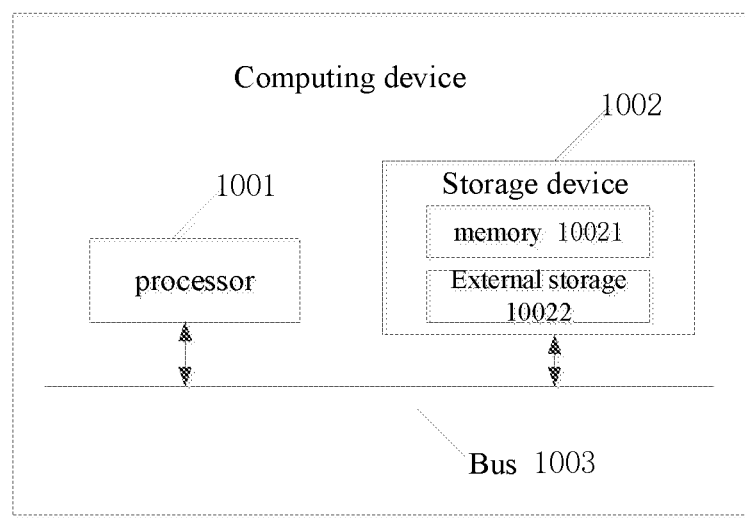
FIG. 10 shows a schematic diagram of a computing device according to an embodiment of the present disclosure.

Corresponding to the text content presentation method in FIG. 1 applied to a terminal, an embodiment of the present disclosure also provides a computing device, as shown in FIG. 10, which is a schematic structural diagram of a computing device provided by an embodiment of the present disclosure, including:

Processor 1001, storage device 1002, and bus 1003, storage device 1002 is used to store executable instructions, including memory 10021 and external storage 10022; memory 10021 here is also called internal storage, and is used for temporarily storing operation data in processor 1001, and the data exchanged with the external storage 10022 such as hard disk, etc., the processor 1001 exchanges data with the external storage 10022 through the memory 10021, when the computing device is running, the processor 1001 communicates with the storage device 1002 through the bus 1003, so that the processor 1001 executes the following instructions:
- acquiring a text to be presented including multiple pieces of text contents, and a target reading auxiliary text corresponding to at least one piece of target text content in the multiple pieces of text contents;
- in response to presenting the target text content on a reading page, presenting a target reading auxiliary text corresponding to the target text content in a first area of the reading page, wherein, the first area is located at a first position in the reading page, and is related to a second position of the target text content in the reading page.

Figure 11:
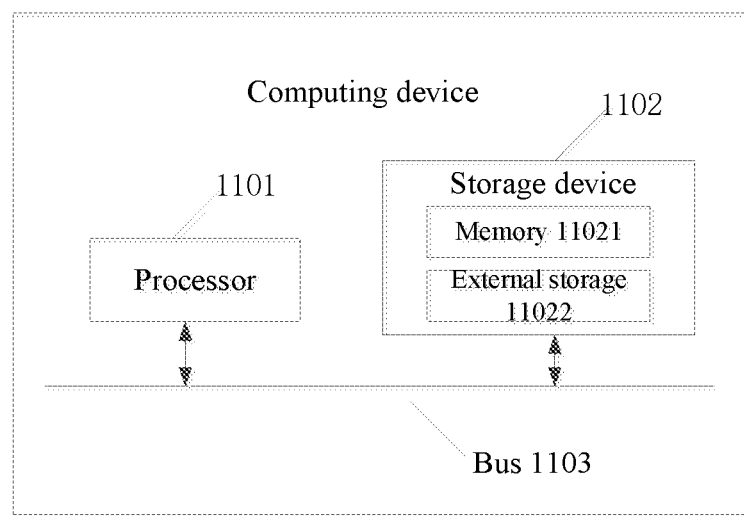
FIG. 11 shows a schematic diagram of another computing device according to an embodiment of the present disclosure.

Corresponding to the text content presentation method applied to the server in FIG. 3, the embodiment of the present disclosure also provides another computing device, as shown in FIG. 11, which is a schematic structural diagram of another computing device according to the embodiment of the present disclosure, including:

Processor 1101, storage device 1102, and bus 1103, storage device 1102 is used to store executable instructions, including memory 11021 and external storage 11022; memory 11021 here is also called internal storage, and is used for temporarily storing operation data in processor 1101, and the data exchanged with the external storage 11022 such as hard disk, etc., the processor 1101 exchanges data with the external storage 11022 through the memory 11021, when the computing device is running, the processor 1101 communicates with the storage device 1102 through the bus 1103, so that the processor 1101 executes the following instructions:
- in response to a text acquisition request, acquiring a text to be presented including multiple pieces of text contents corresponding to the request, and candidate reading auxiliary texts corresponding to respective pieces of text contents,
- determining a target text content based on the multiple pieces of text contents and candidate reading auxiliary texts corresponding to respective pieces of text contents,
- determining a target reading auxiliary text corresponding to the target text content from the candidate reading auxiliary texts corresponding to the target text content, and
- sending the text to be presented, and information indicating presentation position of the target text content and the target reading auxiliary text in the reading page, to a terminal.

It should be pointed out that the bus here is only intended to indicate information transmission between the processor and the memory, which is exemplary and can be implemented in various appropriate ways, such as wired or even wireless, etc., and will not be described in detail her. It may not even be contained within a computing device.

An embodiment of the present disclosure further provides a computer readable storage medium, wherein the computer readable storage medium stores a computer program, and the computer program, when executed by the processor, executes the steps of the text content presentation method in the foregoing method embodiments. The storage medium may be a volatile or non-volatile computer-readable storage medium.

An embodiment of the present disclosure further provides a computer program product, wherein the computer program product carries program codes, instructions included in the program codes may be used to perform the steps of the text content presentation method in the foregoing method embodiment, as seen in the foregoing method embodiments, and details are not repeated herein again.

The computer program product may be specifically implemented by hardware, software, or a combination thereof. In an optional embodiment, the computer program product is specifically embodied as a computer storage medium, and in another optional embodiment, the computer program product is specifically embodied as a software product, such as a software development kit (SDK), etc.

It can be clearly understood by those skilled in the art that for the convenience and conciseness of description, the specific working processes of the system and apparatus described above can refer to corresponding processes in the aforementioned method embodiment, and will not be repeated here. In several embodiments provided by this disclosure, it should be understood that the disclosed system, apparatus and method can be realized in other ways. The apparatus embodiments described above are only schematic, for example, the division of the units is only a kind of logical function division, and there may be another division method in actual implementation. For example, multiple units or components may be combined or integrated into another system, or some features may be ignored or not implemented. On the other hand, the displayed or discussed mutual coupling or direct coupling or communication connection shown or discussed can be indirect coupling or communication connection via some communication interfaces, apparatus or units, which can be in electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of this embodiment.

In addition, each functional unit in each embodiment of the present disclosure may be integrated into one processing unit, or each unit may exist physically alone, or two or more units may be integrated into one unit.

If the functions are realized in the form of software functional units and sold or used as independent products, they can be stored in a processor-executable non-volatile computer-readable storage medium. Based on this understanding, the technical solution of the present disclosure can be embodied in the form of a software product, which is stored in a storage medium and includes several instructions to make a computing device (which can be a personal computer, a server, a network device, etc.) execute all or part of the steps of the method described in various embodiments of the present disclosure. The aforementioned storage media include: U disk, mobile hard disk, Read-Only Memory (ROM), Random Access Memory (RAM), magnetic disk or optical disk and other media that can store program codes. Finally, it should be explained that the above-mentioned embodiments are only specific embodiments of the disclosure, which are used to illustrate the technical scheme of the disclosure, but not to limit it. The protection scope of the disclosure is not limited to this. Although the disclosure has been described in detail with reference to the above-mentioned embodiments, it should be understood by ordinary people in the field that any person familiar with the technical field can still modify or easily think of changes to the technical scheme recorded in the above-mentioned embodiments within the technical scope of the disclosure, however, these modifications, changes or substitutions do not make the essence of the corresponding technical scheme deviate from the spirit and scope of the technical scheme of the embodiment of this disclosure, and should be included in the protection scope of this disclosure. Therefore, the scope of protection of this disclosure should be based on the scope of protection of the claims.

The invention claimed is:

1. A text content presentation method, the method comprising:
    acquiring a text to be presented including multiple pieces of text contents, and candidate reading auxiliary texts corresponding to the multiple pieces of text contents;
    determining at least one piece of target text content in the multiple pieces of text contents, based on correlation degree between a candidate reading auxiliary text with auxiliary value from the candidate reading auxiliary texts corresponding to the multiple pieces of text contents and each piece of text content, wherein the auxiliary value is determined based on interaction data by a user for the candidate reading auxiliary texts; and
    in response to presenting the target text content on a reading page, directly presenting a target reading auxiliary text corresponding to the target text content in a first area of the reading page, wherein, the first area is located at a first position in the reading page which is determined based on a second position of the target text content in the reading page,
    wherein the target reading auxiliary text comprises the candidate reading auxiliary text with a highest auxiliary value in the candidate reading auxiliary text corresponding to the target text content, and
    wherein the first area comprises an area in the reading page which is located subsequent to the second position and separate from the target text content by a certain separate area, and
    wherein the subsequent texts after the target text content in the multiple pieces of text contents are typeset based on a text presentation volume of an area after the first area.

2. The text content presentation method of claim 1, wherein, in response to presenting the target text content on the reading page, presenting the target reading auxiliary text corresponding to the target text content in the first area of the reading page, comprises:
    in response to presenting the target text content on the reading page, determining the second position of the target text content in the reading page, and the first position in the reading page corresponding to the second position, based on typography information about the multiple pieces of text contents and the target reading auxiliary text, and
    presenting the target reading auxiliary text corresponding to the target text content in the first area at the first position.

3. The text content presentation method of claim 2, wherein, in response to presenting the target text content on the reading page, determining the second position of the target text content in the reading page, and the first position in the reading page corresponding to the second position, based on typography information of the multiple pieces of text contents and the target reading auxiliary text, comprises:
    generating the typography information about the multiple pieces of text contents and the target reading auxiliary text, based on text presentation amount in the reading page, preset auxiliary text presentation amount in the reading auxiliary text, and the target text content corresponding to the target reading auxiliary text, and
    determining the second position of the target text content in the reading page and the first position corresponding to the second position, based on typography information.

4. The text content presentation method of claim 1, wherein, in response to presenting the target text content on the reading page, presenting the target reading auxiliary text corresponding to the target text content in the first area of the reading page, comprises:
    in response to presenting the target text content on the reading page, acquiring pre-typography information about the multiple pieces of text contents, wherein the pre-typography information is generated based on text presented amount in the reading page;
    determining the second position of the target text content in the reading page based on the pre-typography information, and determining the corresponding first position in the reading page based on the second position;

determining a first area at the first position based on a preset auxiliary text presentation amount of the reading auxiliary text, and presenting the reading auxiliary text in the first area.

5. The method of claim 1, wherein presenting the target reading auxiliary text corresponding to the target text content in the first area of the reading page comprises:
   determining character presentation attribute of the reading auxiliary text, and area presentation attribute of the first area; and
   displaying the first area in the reading page based on the character presentation attribute and the area presentation attribute, and presenting the target reading auxiliary text corresponding to the target text content in the first area of the reading page.

6. The text content presentation method of claim 1, further comprising:
   for any piece of text content, presenting an auxiliary identifier of the text content at a third position in the reading page; wherein, the auxiliary identifier is used to characterize the auxiliary content corresponding to the piece of text content, and the third position is related to the second position of the piece of text content in the reading page, and
   in response to the auxiliary identifier of any piece of text content being triggered, presenting the reading auxiliary text corresponding to the piece of text content.

7. The text content presentation method of claim 1, said method further comprising:
   presenting key information of the target reading auxiliary text in the first area in the reading page;
   in respondence to a trigger event for the key information, presenting the target reading auxiliary text corresponding to the key information.

8. A computing device, comprising: a processor and a memory, wherein the memory stores machine-readable instructions executable by the processor, and the machine-readable instructions, when executed by the processor, cause the processor to execute the following operations:
   acquiring a text to be presented including multiple pieces of text contents, and a candidate reading auxiliary texts corresponding to the multiple pieces of text contents;
   determining at least one piece of target text content in the multiple pieces of text contents, based on correlation degree between a candidate reading auxiliary text with auxiliary value from the candidate reading auxiliary texts corresponding to the multiple pieces of text contents and each piece of text content, wherein the auxiliary value is determined based on interaction data by a user for the candidate reading auxiliary texts, and
   in response to presenting the target text content on a reading page, directly presenting a target reading auxiliary text corresponding to the target text content in a first area of the reading page, wherein, the first area is located at a first position in the reading page which is determined based on a second position of the target text content in the reading page,
   wherein the target reading auxiliary text comprises the candidate reading auxiliary text with a highest auxiliary value in the candidate reading auxiliary text corresponding to the target text content, and
   wherein the first area comprises an area in the reading page which is located subsequent to the second position and separate from the target text content by a certain separate area, and
   wherein the subsequent texts after the target text content in the multiple pieces of text contents are typeset based on a text presentation volume of an area after the first area.

9. The computing device of claim 8, wherein, in response to presenting the target text content on the reading page, presenting the target reading auxiliary text corresponding to the target text content in the first area of the reading page, comprises:
   in response to presenting the target text content on the reading page, determining the second position of the target text content in the reading page, and the first position in the reading page corresponding to the second position, based on typography information about the multiple pieces of text contents and the target reading auxiliary text, and
   presenting the target reading auxiliary text corresponding to the target text content in the first area at the first position.

10. The computing device of claim 9, wherein, in response to presenting the target text content on the reading page, determining the second position of the target text content in the reading page, and the first position in the reading page corresponding to the second position, based on typography information of the multiple pieces of text contents and the target reading auxiliary text, comprises:
   generating the typography information about the multiple pieces of text contents and the target reading auxiliary text, based on text presentation amount in the reading page, preset auxiliary text presentation amount in the reading auxiliary text, and the target text content corresponding to the target reading auxiliary text, and
   determining the second position of the target text content in the reading page and the first position corresponding to the second position, based on typography information.

11. The computing device of claim 8, wherein, in response to presenting the target text content on the reading page, presenting the target reading auxiliary text corresponding to the target text content in the first area of the reading page, comprises:
   in response to presenting the target text content on the reading page, acquiring pre-typography information about the multiple pieces of text contents, wherein the pre-typography information is generated based on text presented amount in the reading page;
   determining the second position of the target text content in the reading page based on the pre-typography information, and determining the corresponding first position in the reading page based on the second position;
   determining a first area at the first position based on a preset auxiliary text presentation amount of the reading auxiliary text, and presenting the reading auxiliary text in the first area.

12. The computing device of claim 8, wherein presenting the target reading auxiliary text corresponding to the target text content in the first area of the reading page comprises:
   determining character presentation attribute of the reading auxiliary text, and area presentation attribute of the first area; and
   displaying the first area in the reading page based on the character presentation attribute and the area presentation attribute, and presenting the target reading auxiliary text corresponding to the target text content in the first area of the reading page.

13. The computing device of claim 8, wherein the machine-readable instructions, when executed by the processor, cause the processor to further execute the following operations:

for any piece of text content, presenting an auxiliary identifier of the text content at a third position in the reading page; wherein, the auxiliary identifier is used to characterize the auxiliary content corresponding to the piece of text content, and the third position is related to the second position of the piece of text content in the reading page, and in response to the auxiliary identifier of any piece of text content being triggered, presenting the reading auxiliary text corresponding to the piece of text content.

14. The computing device of claim 8, wherein the machine-readable instructions, when executed by the processor, cause the processor to further execute the following operations:

presenting key information of the target reading auxiliary text in the first area in the reading page;

in respondence to a trigger event for the key information, presenting the target reading auxiliary text corresponding to the key information.

15. A non-transitory computer-readable storage medium storing a computer program thereon, and the computer program, when executed by a computing device, causes the computing device to execute the following operations:

acquiring a text to be presented including multiple pieces of text contents, and a candidate reading auxiliary texts corresponding to the multiple pieces of text contents;

determining at least one piece of target text content in the multiple pieces of text contents, based on correlation degree between a candidate reading auxiliary text with auxiliary value from the candidate reading auxiliary texts corresponding to the multiple pieces of text contents and each piece of text content, wherein the auxiliary value is determined based on interaction data by a user for the candidate reading auxiliary texts, and in response to presenting the target text content on a reading page, directly presenting a target reading auxiliary text corresponding to the target text content in a first area of the reading page, wherein, the first area is located at a first position in the reading page which is determined based on a second position of the target text content in the reading page, wherein the target reading auxiliary text comprises the candidate reading auxiliary text with a highest auxiliary value in the candidate reading auxiliary text corresponding to the target text content, and wherein the first area comprises an area in the reading page which is located subsequent to the second position and separate from the target text content by a certain separate area, and wherein the subsequent texts after the target text content in the multiple pieces of text contents are typeset based on a text presentation volume of an area after the first area.

16. The computer-readable storage medium of claim 15, wherein, in response to presenting the target text content on the reading page, presenting the target reading auxiliary text corresponding to the target text content in the first area of the reading page, comprises:

in response to presenting the target text content on the reading page, determining the second position of the target text content in the reading page, and the first position in the reading page corresponding to the second position, based on typography information about the multiple pieces of text contents and the target reading auxiliary text, and presenting the target reading auxiliary text corresponding to the target text content in the first area at the first position.

17. The computer-readable storage medium of claim 15, wherein, in response to presenting the target text content on the reading page, presenting the target reading auxiliary text corresponding to the target text content in the first area of the reading page, comprises:

in response to presenting the target text content on the reading page, acquiring pre-typography information about the multiple pieces of text contents, wherein the pre-typography information is generated based on text presented amount in the reading page;

determining the second position of the target text content in the reading page based on the pre-typography information, and determining the corresponding first position in the reading page based on the second position;

determining a first area at the first position based on a preset auxiliary text presentation amount of the reading auxiliary text, and presenting the reading auxiliary text in the first area.

18. The computer-readable storage medium of claim 15, wherein presenting the target reading auxiliary text corresponding to the target text content in the first area of the reading page comprises:

determining character presentation attribute of the reading auxiliary text, and area presentation attribute of the first area; and displaying the first area in the reading page based on the character presentation attribute and the area presentation attribute, and presenting the target reading auxiliary text corresponding to the target text content in the first area of the reading page.

19. The computer-readable storage medium of claim 15, wherein the computer program, when executed by the processor, causes the processor to further execute the following operations:

for any piece of text content, presenting an auxiliary identifier of the text content at a third position in the reading page; wherein, the auxiliary identifier is used to characterize the auxiliary content corresponding to the piece of text content, and the third position is related to the second position of the piece of text content in the reading page, and in response to the auxiliary identifier of any piece of text content being triggered, presenting the reading auxiliary text corresponding to the piece of text content.

20. The computer-readable storage medium of claim 15, wherein the computer program, when executed by the processor, causes the processor to further execute the following operations:

presenting key information of the target reading auxiliary text in the first area in the reading page;

in respondence to a trigger event for the key information, presenting the target reading auxiliary text corresponding to the key information.

\* \* \* \* \*